Dec. 29, 1964     G. E. CHISHOLM     3,163,340
PAPER DISK CUTTER
Filed Aug. 12, 1963

INVENTOR
George Chisholm

BY

ATTORNEYS

United States Patent Office 3,163,340
Patented Dec. 29, 1964

3,163,340
PAPER DISK CUTTER
George E. Chisholm, 711 35th Ave. Court,
Greeley, Colo.
Filed Aug. 12, 1963, Ser. No. 301,257
9 Claims. (Cl. 225—6)

This invention is a novel paper disk cutter adapted to cut disks of wax paper or the like of diameter ranging from approximately seven to twelve inches for use as linings for the bottoms of circular cake pans; also for use in cutting other types of paper for applications such as bird cage liners, paper doilies, or the like, and the principal object of the invention is to provide a novel and efficient device of the above type which is simple in construction and operation.

A further object of the invention is to provide a paper disk cutter of the above type which may be used in cutting circular linings for cake pans, bird cages, or the like, of increased diameter over that of the pan or cage bottom, whereby the peripheral edges of the cut circular liner may also be extended up the sides of the pan, bird cage, or the like, so that when such liner is applied to the pan the liner will not only cover the bottom of the pan, but will also extend up the sides of the pan.

A further object of the invention is to provide a cutter of the above type having two sets of calibrations thereon, one of which may be used for cutting a liner or the like to cover only the bottom of a circular pan or bird cage, the second set of calibrations being used when it is desired that the lining extend also up the sides of the pan or the like.

Other minor objects of the invention will be hereinafter set forth.

I will explain the invention with reference to the accompanying drawing which illustrates one practical embodiment thereof, to enable others familiar with the art to adopt and use the same, and will summarize in the claims the novel features of construction, and novel combination of parts, for which protection is desired.

In said drawing:

FIG. 1 is a plan view of my novel paper disk cutter showing in dot-and-dash line a folded paper blank inserted in the paper guide thereof preparatory to the tearing operation which will form a substantially circular liner or doily shown in FIG. 11.

FIG. 2 is a transverse section on the line 2—2, FIG. 1.
FIG. 3 is a transverse section on the line 3—3, FIG. 1.
FIG. 4 is a vertical section on the line 4—4, FIG. 1.
FIG. 5 is a view of paper sheet from which the folded blank is to be made, indicating the manner of forming the first fold therein.

Figure 1:
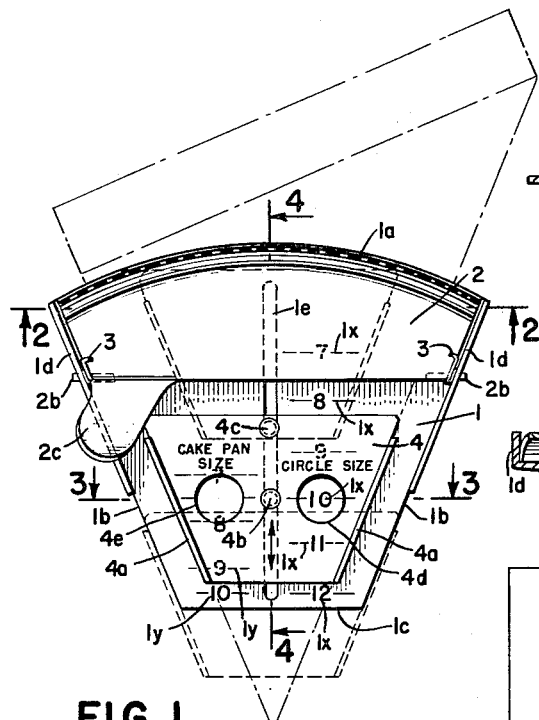

As shown in the drawing, my novel paper disk cutter preferably comprises a base plate 1 having an arcuate upper edge 1a and downwardly converging sides 1b which preferably subtend an angle of approximately 45°, said base having a truncated lower edge 1c. Preferably the upper portion of the sides 1b are provided with flanges 1d which extend outwardly normal to the plane of base plate 1 for the purpose hereinafter described. Extending axially of the base plate 1 is an elongated slot 1e which extends from a point adjacent the upper arcuate edge 1a to a point adjacent the lower truncated edge 1c. Preferably the upper arcuate edge 1a is bowed slightly outwardly, as indicated in FIG. 2, for the purpose hereinafter described.

Figures 2, 4:
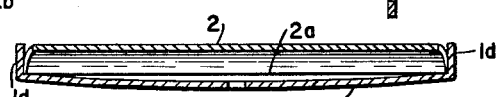
Figure 7:
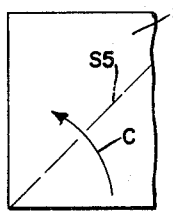
FIG. 7 is a view of the folded sheet shown in FIG. 6 indicating the manner of making the third fold therein.
Figure 8:
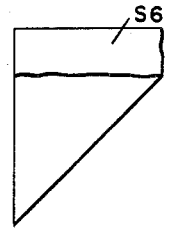
FIG. 8 is a view of the folded sheet shown in FIG. 7 after the final fold has been made therein.

Hingedly mounted on the base plate 1 is a clamping jaw 2 having an inturned upper arcuate edge 2a conforming in extent and curvature to that of the upper edge 1a of base plate 1, as shown in FIGS. 1 and 4. The clamping jaw 2 has adjacent its lower edge laterally extending pins 2b entering holes in the side flanges 1d of base plate 1, and at one side of the lower edge of clamping jaw 2 extends a thumb lever 2c whereby the clamping jaw 2 may be opened with respect to the upper arcuate edge 1a of the base plate. If desired, springs 3, FIGS. 1 and 4, may be interposed between base plate 1 and clamping jaw 2 around the pivot pins 2b normally urging the upper edge of the clamping jaw 2 into contact with the upper edge 1a of the base plate. However, springs 3 may be omitted if desired.

Vertically adjustably mounted upon base plate 1 is a paper guide 4 having downwardly converging sides which are flanged as at 4a, the flanges 4a subtending an angle of approximately 45° therebetween. Extending from the rear face of the paper guide 4 on the axis thereof is a pin 4b, FIGS. 1 and 4, which engages the sides of slot 1e, said pin 4b being disposed at approximately the center of the paper guide 4. On the vertical axis of the paper guide, adjacent the upper edge thereof, is a threaded stud 4c, shown in FIGS. 1, 3 and 4, which stud also passes through the slot 1e and is provided on its outer end with a washer 5 and a thumb nut 6, whereby when the thumb nut is tightened the paper guide 4 will be locked in vertically adjusted position on base 1.

Figure 3:
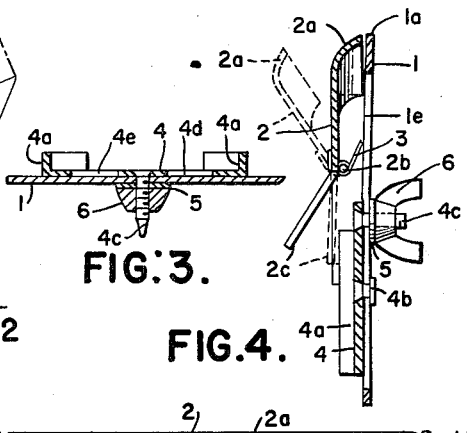

In the paper guide 4, at each side of the vertical axis thereof, are holes 4d and 4e, respectively, FIGS. 1 and 3, forming sight openings to expose indicia markings on the base plate 1. The indicia 1x as shown in FIG. 1, which are visible through the sight opening 4d consists of the numerals 7, 8, 9, 10, 11 and 12, respectively, the indicia being spaced apart so that when the indicia 10 appears through sight opening 4d in FIG. 1, a paper liner or the like may be torn or cut from the blank having a ten inch diameter. Similarly, when the indicia 7, 8, 9, 11 or 12 appear through side opening 4d, the paper liner cut by the device will have correspondingly sized diameters.

Figure 10:
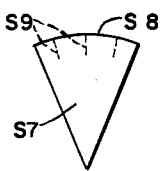
FIG. 10 is a view of the folded blank after the tearing operation, and showing additional radial tears in the arcuate peripheral portion of the blank to enable the liner to readily conform with the bottom of the cage pan or bird cage, and the peripheral portion thereof to extend upwardly around the sides of the pan or bird cage.

Similarly, the base plate 1 is marked on the other side of the slot 1e with indicia 1y, such as 7, 8, 9 and 10, respectively, which are exposed through the sight opening 4e. The indicia 1y are used to form circular liners or disks of larger size than that formed when using the indicia 1x, since the liners formed when utilizing the sight opening 4e are intended to cover not only the bottoms of the pans or bird cages, but also to extend wholly or partially up the sides of the cake pans or bird cages, the shaping of the peripheries of the larger size liners which extend somewhat up the sides of the pans or bird cages being facilitated by forming short radially disposed tears in the arcuate periphery of the torn paper blank as shown in FIG. 10, as hereinafter described. Thus by using the sight opening 4d and the associate indicia 1x, the liner shown in FIG. 10 will have the proper diameter to fit only the bottom of the pan or bird cage. However, when using the sight opening 4e and the associated indicia 1y, the circular liner shown in FIG. 11 will be of an increased diameter so that the periphery of the circular liner may be flanged to extend partly or wholly up the sides of the pan or the like.

Figure 5:
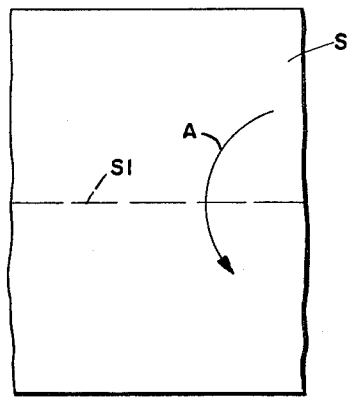
Figure 6:
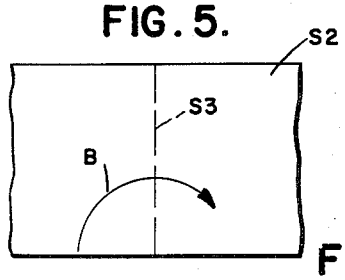
FIG. 6 is a view of the folded sheet shown in FIG. 5 indicating the manner of making the second fold therein.

FIGS. 4 to 8 indicate diagrammatically the method of folding a rectangular sheet for use with my cutting device. In FIG. 5 the rectangular sheet S of appropriate size is first folded downwardly as indicated by the arrow A along the central transverse line S1, thus forming a rectangular sheet S2, FIG. 6, of half the size of sheet S. The sheet S2 shown in FIG. 6 is then folded in the direction of the arrow B along the central vertical line S3 (FIG. 6) to form folded sheet S4 having a size approximately one-fourth of sheet S, said sheet being indicated in FIG. 7. The sheet S4, shown in FIG. 7, then has its lower righthand corner folded upwardly in the direction of the arrow C along a line S5, FIG. 7, which is disposed at an angle of 45° to the horizontal, thereby forming a blank S6 shown in FIG. 8, which shows the final shape of the folded blank used in connection with the device.

Figure 9:
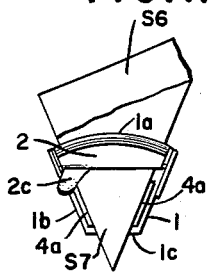
FIG. 9 is a view showing the folded sheet of FIG. 8 inserted into the paper guide of the cutter preparatory to tearing the sheet to form the substantially circular liner or doily shown in FIG. 11.

FIG. 9 shows the folded blank S6 inserted into the device with its lower pointed end engaging the converging sides 4a of the paper guide 4, the upper portion of the blank S6 extending above the arcuate edges 1a, 2a, of the base plate 1 and the clamping jaw 2. When in such position, the user would then, with one hand, squeeze the clamping jaw 2 firmly against the base plate 1 and with the other hand would tear the upper projecting portion of blank S6 from the lower portion S7, thus providing a substantially triangular folded blank S7 shown in FIG. 9 having an arcuate upper edge S8. The folded blank S7 may then be unfolded to form a substantially circular liner indicated in FIG. 11 to accurately fit the bottom of the pan. Of course, the peripheral edge S8 of blank S7 shown in FIG. 11 would only be truly circular for one size of the liner. For other sizes, the peripheral portion of the liner between the fold lines indicated in dotted lines in FIG. 11 would be in the nature of slightly scalloped or slightly flattened outer edges rather than truly circular. However, the variance from the truly circular for the different sizes of liners formed by my device is of no consequence in use.

Figure 11:
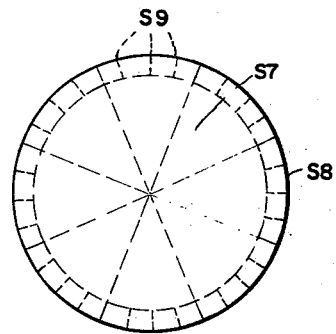
FIG. 11 is a plan view of the unfolded torn blank, ready for use as a liner.

In cases where the liner is to extend upwardly to cover the sides or the lower portions of the sides of the circular pan or the like, the sight opening 4e, FIG. 1, would be used, in which case the circular blank S7, FIG. 11, would be larger than the actual diameter of the bottom of the pan, the outer marginal portions of the liner being upturned to extend upwardly around the sides of the pan.

To facilitate the upward turning of the peripheral portions of the liner S7 around the sides of the pan, after the blank S7, FIG. 10, has been formed, the arcuate edge of the blank S7, FIG. 10, would be provided with a series of spaced radial tears S9, whereby the paper between the tears may be folded upwardly along the sides of the bottom of the pan without forming bulky folds in the main body portion thereof.

Thus, I have provided a device which is calibrated to cut disks of paper which will fit up around the sides of the cake pans, as well as calibrations for disks which will cover only the bottoms of the pans.

Ordinarily there would be an advantage in covering the entire bottom and sides of the cake pan with wax paper to prevent the dough from sticking to the sides and bottom of the pan.

As previously stated, the arcuate edge 1a of the base plate 1 is slightly curved with respect to the arcuate edge 2a of the clamping jaw 2 so that when the plates 1 and 2 are pressed together by the hand of the user, sufficient clamping pressure on the paper along the entire arc of the cutting edge will be provided to hold the paper firmly during the tearing operation. Obviously this curvature could be incorporated in the cutting edge of the clamping jaw 2a instead of the cutting edge 1a of the base plate, if desired.

I do not limit my invention to the exact form shown in the drawing, for obviously changes may be made therein within the scope of the claims.

I claim:

1. A paper disk cutter for forming substantially circular liners for the bottoms and sides of circular pans or the like from folded paper blanks, the sides of which blanks converge downwardly at their lower ends, comprising a base plate having an arcuate upper edge; a clamping plate pivotally mounted on said base plate and having an arcuate upper edge substantially conforming in extent and curvature with that of the base plate and adapted to clamp the upper portion of the folded blank therebetween; and a guide vertically adjustably mounted on the base plate and having downwardly converging sides adapted to engage the downwardly converging sides of the blank to limit the amount of entry of the blank between the base plate and clamping plate, whereby the upper portion of the blank may be readily torn off along the arcuate cutting edges of the base plate and clamping plate for forming a circular liner of diameter conforming with the setting of the guide.

2. In a cutter as set forth in claim 1, the upper arcuate edge of one of the plates being slightly outwardly bowed, whereby when the plates are compressed by the hand of the user during the tearing operation the blank will be held firmly therebetween throughout the entire arcuate length.

3. In a cutter as set forth in claim 1, said base plate having a vertical slot therein, a pin on said guide slidably engaging said slot; a threaded stud on said guide offset from said pin and also extending through said slot; and a nut on said stud for binding the guide in adjusted position on the base plate.

4. A paper disk cutter for forming substantially circular liners for the bottoms and sides of circular pans or the like from folded paper blanks, the sides of which blanks converge downwardly at their lower ends, comprising a base plate having an arcuate upper edge; a clamping plate pivotally mounted on said base plate and having an arcuate upper edge substantially conforming in extent and curvature with that of the base plate and adapted to clamp the upper portion of the folded blank therebetween; a guide vertically adjustably mounted on the base plate and having downwardly converging sides adapted to engage the downwardly converging sides of the blank to limit the amount of entry of the blank between the base plate and clamping plate, whereby the upper portion of the blank may be readily torn off along the arcuate cutting edges of the base plate and clamping plate to form a circular liner of diameter conforming with the setting of the guide, and indicia on the base plate cooperating with indicia on the guide for predetermining the diameter of the circular liner.

5. In a cutter as set forth in claim 4, the upper arcuate edge of one of the plates being slightly outwardly bowed, whereby when the plates are compressed by the hand of the user during the tearing operation the blank will be held firmly therebetween throughout the entire arcuate length.

6. In a cutter as set forth in claim 4, said base plate having a vertical slot therein, a pin on said guide slidably engaging said slot; a threaded stud on said guide offset from said pin and also extending through said slot; and a nut on said stud for binding the guide in adjusted position on the base plate.

7. In a combination as set forth in claim 4, said indicia comprising a set of spaced numerals on the base plate in way of the guide denoting the diameter of the bottom of the pan, and which numerals are respectively visible through a sight opening in the guide as the latter is adjusted.

8. In a combination as set forth in claim 4, said indicia comprising a set of spaced numerals on the base plate in way of the guide denoting the diameter of the bottom of the pan combined with the height of the sides of the pan, and which set of numerals are respectively visible through a sight opening in the guide as the latter is adjusted.

9. In a combination as set forth in claim 4, said indicia comprising a set of spaced numerals on the base plate in way of the guide denoting the diameter of the bottom of the pan, and which numerals are respectively visible through a sight opening in the guide as the latter is adjusted; and another set of spaced numerals on the base plate in way of the guide denoting the diameter of the bottom of the pan combined with the height of the sides of the pan, and which second set of numerals are respectively visible through a second sight opening in the guide as the latter is adjusted.

References Cited in the file of this patent

UNITED STATES PATENTS

| | | |
|---|---|---|
| 1,008,135 | Gordon | Nov. 7, 1911 |
| 1,095,598 | Roberts | May 5, 1914 |
| 2,558,657 | MacDonald | June 26, 1951 |
| 2,576,091 | McElroy | Nov. 27, 1951 |

FOREIGN PATENTS

| | | |
|---|---|---|
| 884,670 | France | Aug. 24, 1943 |